UNITED STATES PATENT OFFICE.

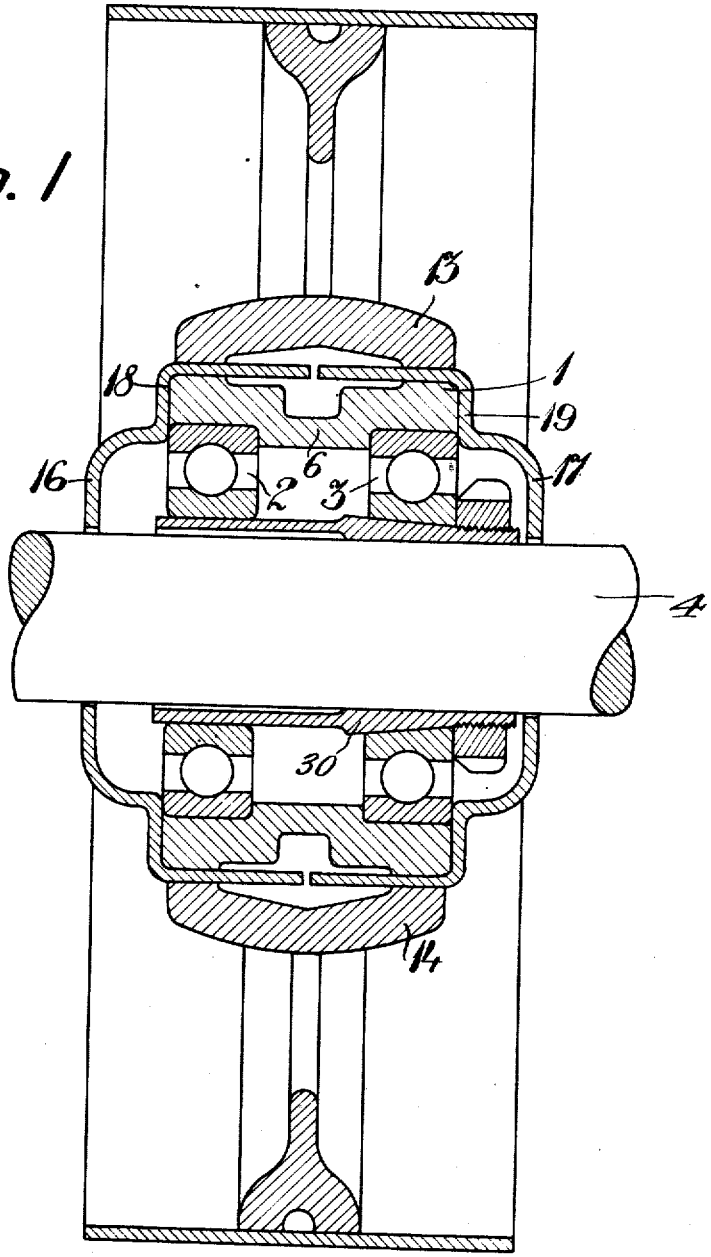

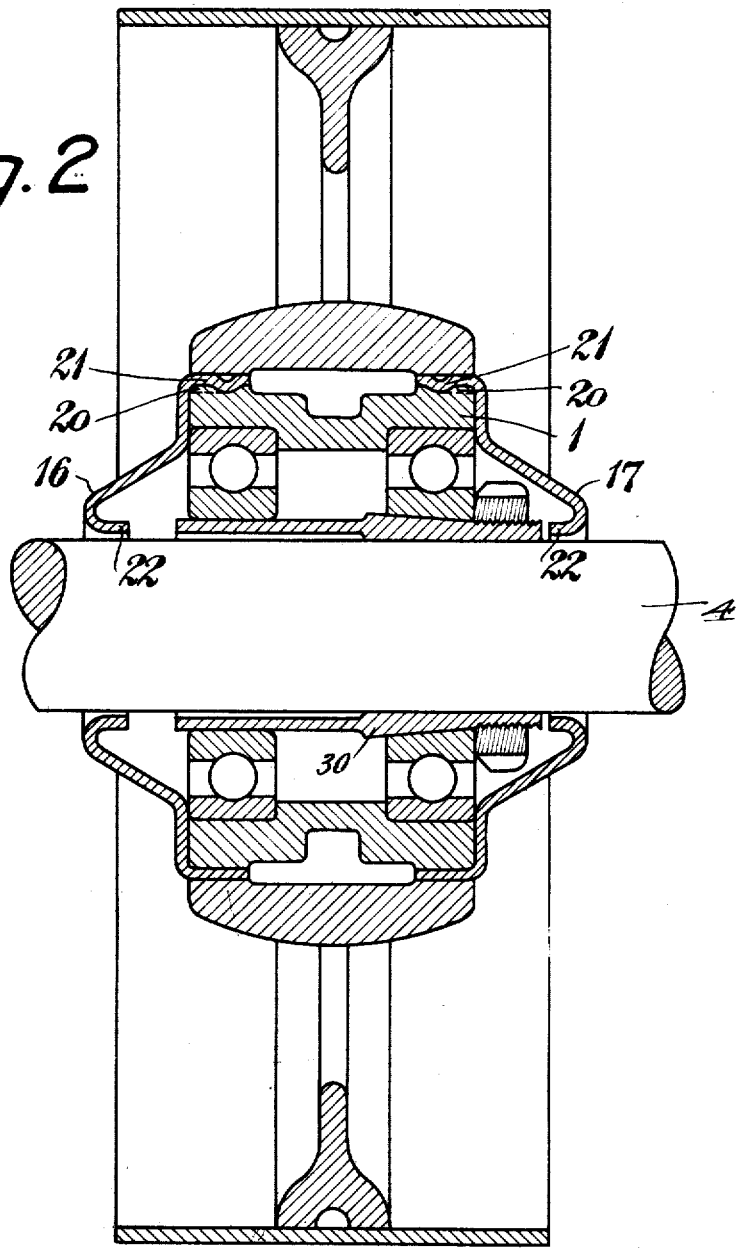

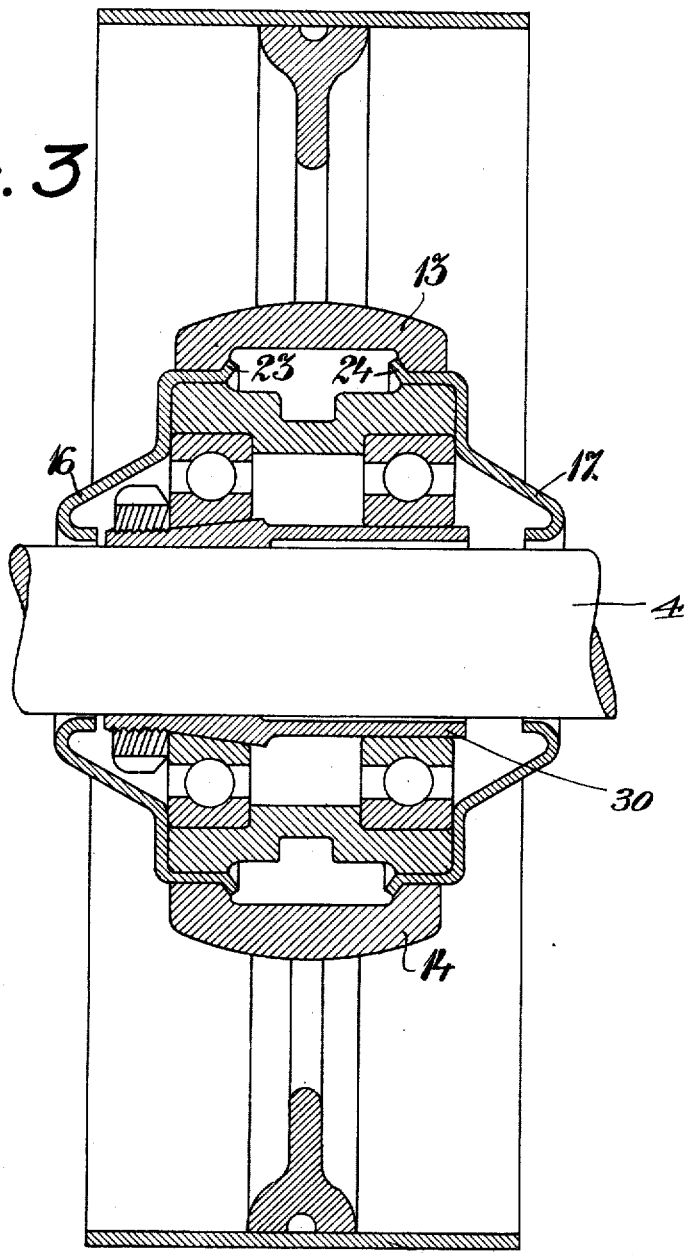

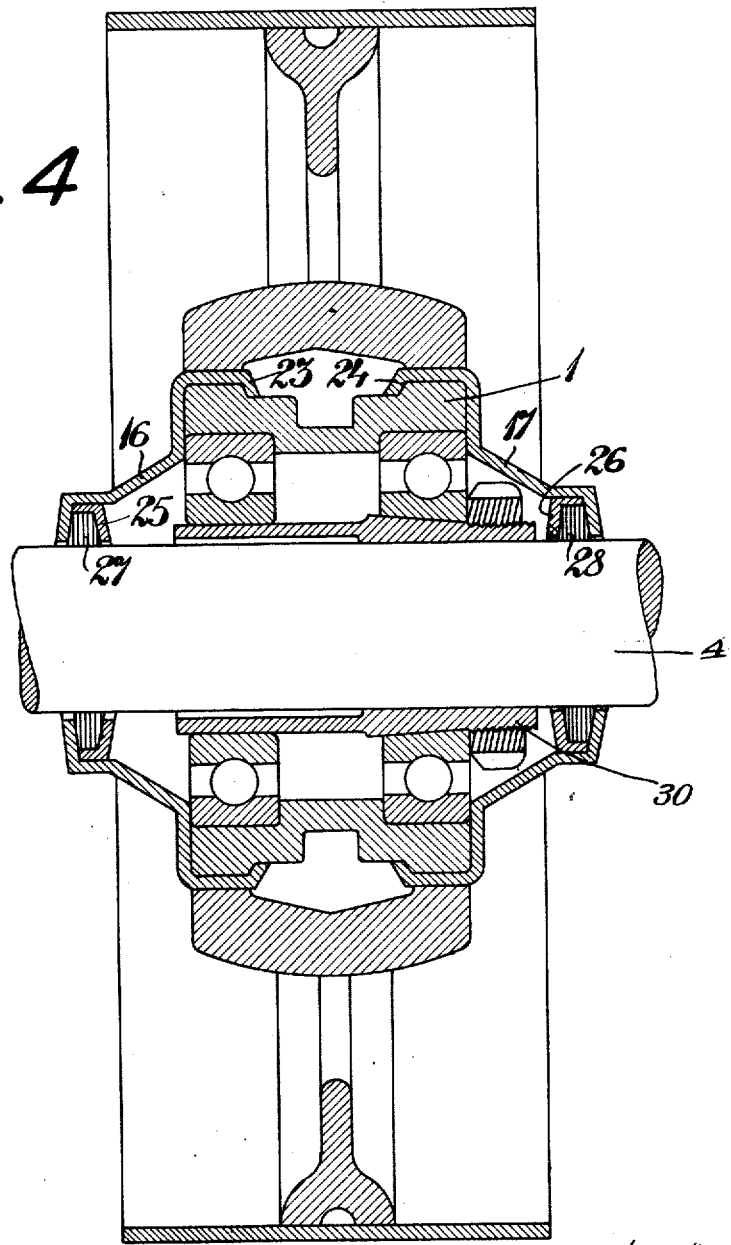

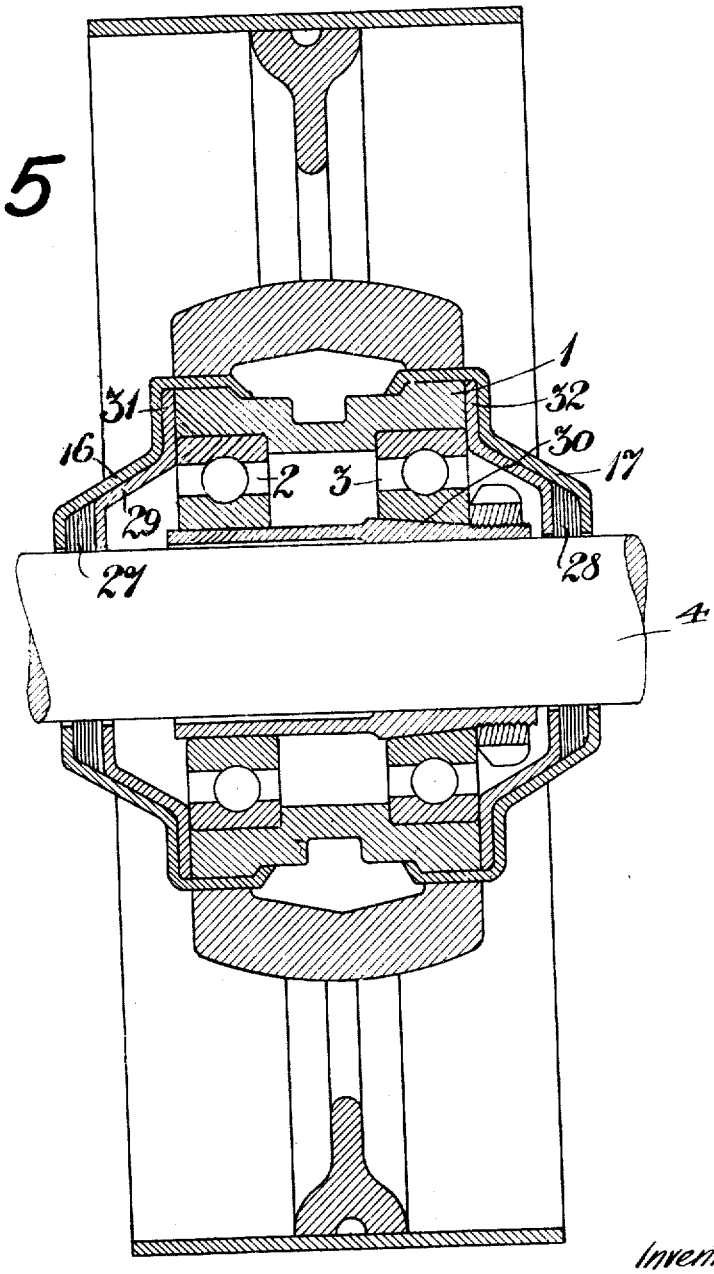

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BEARING FOR LOOSE PULLEYS.

1,381,178.            Specification of Letters Patent.      Patented June 14, 1921.

Application filed August 28, 1919. Serial No. 320,427.

*To all whom it may concern:*

Be it known that I, BENGT WIKTOR FJELLMAN, a subject of the King of Sweden, residing at Gottenborg, in the Kingdom of Sweden, have invented new and useful Improvements in Bearings for Loose Pulleys, of which the following is a specification.

This invention relates to means whereby loose pulleys may be mounted on ball or roller bearings, which comprises an undivided sleeve directly surrounding the ball or roller bearings and having, preferably, on its inner cylindrical surface an inwardly extending flange affording a support for the ball or roller bearings in the lateral direction.

The object of this invention is to provide simple and reliable means for holding the ball or roller bearings in proper position on the said sleeve, and consists, chiefly, in that the bushing sleeve with the ball or roller bearings placed therein is surrounded by two symmetrical or substantially symmetrical sheet metal caps which are locked to the bushing sleeve or to the hub of the loose pulley or to both of said elements by suitable locking means.

In the accompanying drawing, Figures 1–5, inclusive, show axial sections of loose pulleys having bushings according to this invention.

In the embodiment shown in Fig. 1, the bushing comprises a sleeve 1 surrounding the outer track rings of two ball bearings 2 and 3. Formed on the inner cylindrical surface of the sleeve 1 is a central annular flange 6, engaging between the outer track rings of the ball bearings 2 and 3 and affording a lateral support for said rings so as to maintain the latter at a fixed distance apart. To secure the ball bearings in the sleeve 1 there are provided around the said sleeve as well as around the shaft 4, two sheet metal caps 16, 17 bearing with flat portions 18, 19, respectively, against the outer ends of the outer track rings of the ball bearings, and also bearing against the ends of the sleeve 1. After the sleeve 1, the ball bearings 2, 3 and the sheet metal caps are placed in the proper position with respect to each other, the hub halves 13, 14 are placed around the caps 16, 17, respectively, and are clamped together by means of screw bolts (not shown) extending therethrough in the usual manner so that the sheet metal caps will be held in place, in part, by the friction between the caps and the sleeve 1, and, in part, by the friction between the caps and the hub 13, 14.

The embodiment shown in Fig. 2 differs from that shown in Fig. 1, chiefly, in that the bushing sleeve 1 is formed on its outer cylindrical surface with grooves 20 while the sheet metal caps 16, 17 are formed with corresponding depressions 21, said grooves and said depressions forming together a bayonet clutch for locking the caps to the sleeve 1 whereby the caps will be maintained in place more safely than by frictional engagement only. Furthermore, those edges 22 of the caps adjacent to the shaft are bent inwardly to render the entrance of dust and other impurities to the bearings more difficult.

The embodiment shown in Fig. 3 differs from that shown in Fig. 2 only in that the bayonet clutches are substituted by outwardly extending bends 23, 24 of the ends of the caps facing each other whereby the caps 16, 17 will be locked to the hub 13, 14 due to the placing of the latter on the caps.

In the embodiment shown in Fig. 4 the ends of the caps 16, 17 facing each other are formed with inwardly extending bends 23, 24 by means of which the caps are locked to the bushing sleeve 1. Attached to the edges of the caps adjacent to the shaft are angularly shaped sheet metal rings 25, 26 providing together with said edges annular chambers for receiving packings 27, 28.

The embodiment shown in Fig. 5 differs from that shown in Fig. 4 essentially in that the sheet metal rings 25, 26 are substituted by cup-shaped sheet metal members 29, 30 bearing against the ends of the sleeve 1 and of the ball bearings 2, 3 with outer flat-shaped portions and in turn tightly embraced by the sheet metal caps 16, 17. The packings 27, 28 are in this case interposed between the spaced edges of the members 29, 30 and of the caps 16, 17 facing the shaft.

In each figure there is shown the usual adapter sleeve 30 between the inner bearing race rings and the shaft; this is shown as coned within one race ring, and is counterbored so as to be separated from the shaft within the other, this portion being slightly yielding.

In this specification, and in the claims, the term "roller bearings" is used as generic, including bearings wherein the rolling elements are balls or other rolling devices.

Having thus described my invention, I claim:—

1. A bearing construction for loose pulleys, comprising roller bearings, a sleeve adapted to surround said bearings, and two housing caps each surrounding one end of the said sleeve and in turn adapted to be surrounded by the loose pulley.

2. A bearing construction for loose pulleys, comprising roller bearings, an undivided sleeve adapted to directly surround said bearings, two housing caps, each surrounding one end of the said sleeve and in turn adapted to be surrounded by the hub of the loose pulley, and means for maintaining the said caps in place between said hub and said sleeve.

3. A bearing construction for loose pulleys, comprising roller bearings, an undivided sleeve, adapted to directly surround the said bearings, and two sheet metal caps each surrounding one end of the said sleeve, with auxiliary means for maintaining the said caps in place on the said sleeve.

4. A bearing construction for loose pulleys, comprising roller bearings, an undivided sleeve, adapted to directly surround the said bearings, and two caps, each surrounding one end of said sleeve and adapted to be surrounded by the hub of the loose pulley, each cap having means engaging said sleeve for retaining the caps in place.

5. A bearing construction for loose pulleys, comprising roller bearings an undivided sleeve adapted to directly surround the said bearings, and two caps, each surrounding one end of the said sleeve, the caps and sleeve having annular portions reciprocally engaging for locking the caps to the said sleeve.

6. A bearing construction for loose pulleys, comprising roller bearings, an undivided sleeve surrounding said bearings, two sheet metal caps each surrounding one end of said sleeve and also surrounding the said shaft, annular sheet metal bodies placed within said caps and also surrounding the shaft to form annular chambers around the shaft between themselves and the said caps, and packing material placed in said chambers and bearing against the shaft.

In testimony whereof I have signed my name.

BENGT WIKTOR FJELLMAN.